US008879806B2

(12) United States Patent
Baek

(10) Patent No.: US 8,879,806 B2
(45) Date of Patent: Nov. 4, 2014

(54) APPARATUS AND METHOD FOR CAPTURING ROLLED FINGERPRINT IMAGE

(75) Inventor: Younghyun Baek, Seoul (KR)

(73) Assignee: Union Community Co., Ltd., Seoul (KR)

( * ) Notice: Subject to any disclaimer, the term of this patent is extended or adjusted under 35 U.S.C. 154(b) by 213 days.

(21) Appl. No.: 13/550,738

(22) Filed: Jul. 17, 2012

(65) Prior Publication Data

US 2013/0022247 A1 Jan. 24, 2013

(30) Foreign Application Priority Data

Jul. 19, 2011 (KR) .................. 10-2011-0071273

(51) Int. Cl.
*G06K 9/00* (2006.01)

(52) U.S. Cl.
CPC .................. *G06K 9/00026* (2013.01)
USPC .......................... 382/124; 382/118

(58) Field of Classification Search
CPC ..... G06K 9/00; G06K 9/00006; G06K 9/001; G06K 9/00744; G06K 9/32; G06K 2209/00; G06K 2009/00; G06K 2009/00006
USPC ........................................ 382/124
See application file for complete search history.

(56) References Cited

U.S. PATENT DOCUMENTS

| | | | | |
|---|---|---|---|---|
| 5,748,766 | A * | 5/1998 | Maase et al. | 382/124 |
| 6,795,570 | B1 * | 9/2004 | Eichhorn et al. | 382/124 |
| 6,987,588 | B2 * | 1/2006 | Yao et al. | 358/3.14 |
| 2001/0033687 | A1 * | 10/2001 | Mori | 382/181 |
| 2003/0091219 | A1 * | 5/2003 | Martinez et al. | 382/124 |
| 2004/0208349 | A1 * | 10/2004 | Ide | 382/124 |
| 2005/0047631 | A1 * | 3/2005 | Zyzdryn | 382/124 |
| 2006/0120576 | A1 * | 6/2006 | Chen | 382/124 |
| 2010/0046022 | A1 * | 2/2010 | Phelan et al. | 358/1.14 |
| 2010/0322537 | A1 * | 12/2010 | McClurg | 382/312 |
| 2011/0038513 | A1 * | 2/2011 | Du et al. | 382/124 |
| 2011/0286640 | A1 * | 11/2011 | Kwon et al. | 382/124 |
| 2011/0286686 | A1 * | 11/2011 | Kwon et al. | 382/294 |
| 2013/0100267 | A1 * | 4/2013 | Baek | 348/77 |

* cited by examiner

*Primary Examiner* — Stephen R Koziol
*Assistant Examiner* — Shaghayegh Azima
(74) *Attorney, Agent, or Firm* — Leydig, Voit & Mayer, Ltd.

(57) ABSTRACT

A method and apparatus for capturing rolled fingerprint images are provided. The method for capturing rolled fingerprint image acquires elemental image frames from a fingerprint that touches and rolls on a fingerprint input window, acquires improved image frames through preprocessing by removing an image that does not overlap between adjacent elemental image frames, extracts main data of adjacent improved image frames to acquire main data image frames, and merges images of the main data image frames to acquire a rolled fingerprint image.

8 Claims, 9 Drawing Sheets

1-st ELEMENTAL IMAGE FRAME 2-nd ELEMENTAL IMAGE FRAME 3-rd ELEMENTAL IMAGE FRAME 4-th ELEMENTAL IMAGE FRAME 5-th ELEMENTAL IMAGE FRAME 6-th ELEMENTAL IMAGE FRAME 7-th ELEMENTAL IMAGE FRAME 8-th ELEMENTAL IMAGE FRAME 9-th ELEMENTAL IMAGE FRAME 10-th ELEMENTAL IMAGE FRAME 11-th ELEMENTAL IMAGE FRAME 12-th ELEMENTAL IMAGE FRAME 1-st MAIN DATA IMAGE FRAME 2-nd MAIN DATA IMAGE FRAME 3-rd MAIN DATA IMAGE FRAME 4-th MAIN DATA IMAGE FRAME 5-th MAIN DATA IMAGE FRAME 6-th MAIN DATA IMAGE FRAME 7-th MAIN DATA IMAGE FRAME 8-th MAIN DATA IMAGE FRAME 9-th MAIN DATA IMAGE FRAME 10-th MAIN DATA IMAGE FRAME 1-st MERGENCE IMAGE FRAME 2-nd MERGENCE IMAGE FRAME 3-rd MERGENCE IMAGE FRAME 4-th MERGENCE IMAGE FRAME 5-th MERGENCE IMAGE FRAME 6-th MERGENCE IMAGE FRAME 7-th MERGENCE IMAGE FRAME 8-th MERGENCE IMAGE FRAME 9-th MERGENCE IMAGE FRAME

APPARATUS AND METHOD FOR CAPTURING ROLLED FINGERPRINT IMAGE

CROSS-REFERENCE TO RELATED APPLICATION

This application claims priority to and the benefit of Korean Patent Application No. 2011-0071273, filed on Jul. 19, 2011, the disclosure of which is incorporated herein by reference in its entirety.

BACKGROUND

1. Field of the Invention

The present invention relates to an apparatus and method for capturing rolled fingerprint image, and more particularly, to an apparatus and method for capturing rolled fingerprint image that quickly and clearly acquire a fingerprint region broader than a flat fingerprint and thus acquire more fingerprint information.

2. Discussion of Related Art

A biometric recognition method has uniqueness and high invariability, and thus is widely used for user authentication. In such a biometric recognition method, a fingerprint recognition method is a recognition method that is more old and generalized than other biometric recognition fields because it is convenient and simple to use.

Fingerprint recognition apparatuses are being actually used in various fields, which requires authentication for security and official settlement systems, such as access control, electronic commerce, financial transactions, and personal computers (PCs). As a fingerprint image acquiring method, a method that brings only the central portion of a fingerprint into contact with a fingerprint recognition apparatus to acquire only a flat fingerprint image is widely used at the present. Such a method is being widely used because image processing necessary for fingerprint recognition is relatively simple. However, the method cannot secure the entire image of a fingerprint, and thus, a recognition rate is reduced, and it is vulnerable to determine an imitation fingerprint.

To overcome such drawbacks, a method for capturing rolled fingerprint image is proposed. The method for capturing rolled fingerprint image is a method that brings a user's finger into contact with a fingerprint input window while rotating the finger and thus acquires a fingerprint image for an entire fingerprint. Such a method has a recognition rate higher than a method that generates only an image for a central portion of a fingerprint. However, the method for capturing rolled fingerprint image is not widely used because image processing is relatively complicated and a fingerprint can be lost in an image processing operation.

In a conventionally known rolled fingerprint acquiring method, there are a method (Korean Patent Publication No. 1997-0017033) that depends on a hardware apparatus and a method (Korean Patent Publication No. 1999-013325) that calculates and matches the directionality and feature point of time-series input information in units of a frame. Even in such conventional technology, a processing speed becomes slower due to a complicated image processing method, or it is difficult to acquire a clear image due to the characteristic of a fingerprint image.

SUMMARY OF THE INVENTION

The present invention is directed to a rolled fingerprint image capturing apparatus and method that increase a data processing speed for acquiring a rolled fingerprint, and calculate a clear fingerprint image.

According to an aspect of the present invention, there is provided a method for capturing rolled fingerprint image including: acquiring a plurality of elemental image frames from a fingerprint that rolling-touches a fingerprint input window; acquiring a plurality of improved image frames through a preprocessing operation of removing an image that is not overlapped between adjacent elemental image frames; extracting main data between adjacent improved image frames to acquire a plurality of main data image frames; and merging images of the main data image frames to acquire a rolled fingerprint image.

The acquiring of a plurality of improved image frames may include performing an OR operation on a plurality of data between the same pixels in the adjacent elemental image frames to remove a black image that exists in only one pixel of the pixels.

The acquiring of a plurality of main data image frames may include performing an arithmetic addition operation on a plurality of data between the same pixels in the adjacent improved image frames to generate a synthesized main data image frame.

The merging of images may include performing an OR operation on a plurality of data between the same pixels in adjacent main data image frames to merge the images.

According to another aspect of the present invention, there is provided an apparatus for capturing rolled fingerprint image including: a fingerprint input unit configured to acquire a plurality of elemental image frames from a fingerprint that rolling-touches a fingerprint input window; a preprocessor configured to acquire a plurality of improved image frames through a preprocessing operation of removing an image that is not overlapped between adjacent elemental image frames; a main data acquirer configured to extract main data between adjacent improved image frames to acquire a plurality of main data image frames; and an image merger configured to merge images of the main data image frames to acquire a rolled fingerprint image.

The preprocessor may perform an OR operation on a plurality of data between the same pixels in the adjacent elemental image frames.

The main data acquirer may perform an arithmetic addition operation on a plurality of data between the same pixels in the adjacent improved image frames.

The image merger may perform an OR operation on a plurality of data between the same pixels in adjacent main data image frames.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
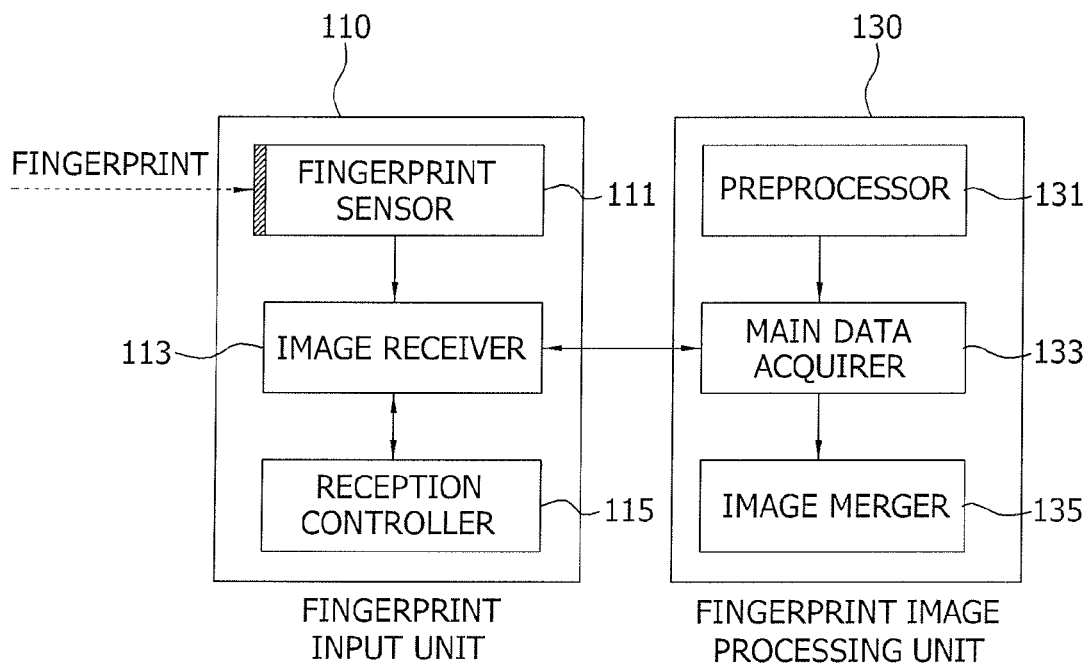
FIG. 1 is a block diagram illustrating an apparatus for capturing rolled fingerprint image according to an exemplary embodiment of the present invention.

FIG. 1 is a block diagram illustrating an apparatus for capturing rolled fingerprint image according to an exemplary embodiment of the present invention.

Referring to FIG. 1, an apparatus for capturing rolled fingerprint image 100 according to an exemplary embodiment of the present invention includes a fingerprint input unit 110 and a fingerprint image processing unit 130, and acquires a rolled fingerprint from a user fingerprint.

The fingerprint input unit 110 acquires fingerprint images of a plurality of frames for acquiring a rolled fingerprint from a user fingerprint that rolling-touches a fingerprint input window 111a, and supplies the fingerprint images to the fingerprint image processing unit 130. Here, the rolled fingerprint (rolled fingerprint image) is used in contrast with a flat fingerprint, and denotes a piece of fingerprint (image) that is acquired from an entire user fingerprint by rotating a rolling type of user finger.

Specifically, the fingerprint input unit 110 includes a fingerprint sensor 111, an image receiver 113, and a reception controller 115. The fingerprint input unit 110 acquires fingerprint images of a plurality of frames from a user fingerprint, which rolling-touches the fingerprint input window 111a, according to a time-series scan scheme.

The fingerprint sensor 111 acquires a fingerprint image of a fingerprint that touches the fingerprint input window 111a, and outputs the fingerprint image to the image receiver 113. Here, the fingerprint sensor 111 may use a non-optical type, but may use an optical type fingerprint sensor in consideration of the formation of a fingerprint input window for the rolling input of a fingerprint.

The image receiver 113 acquires fingerprint images of a plurality of frames from the fingerprint input unit 110 and outputs the fingerprint images to the fingerprint image processing unit 130 according to a control by the reception controller 115.

The reception controller 115 automatically determines whether a fingerprint touches the fingerprint input window 111a on the basis of an image inputted from the image receiver 113, and when it is determined that the fingerprint touches the fingerprint input window 111a, the reception controller 115 controls the image receiver 113 to generate images of a plurality of frames for acquiring a rolled fingerprint.

For automatic sensing, the reception controller 115 compares a threshold value (threshold range) with a characteristic value (for example, an average grayscale value) of an image frame (background frame) that is obtained when there is no fingerprint touch, and when the characteristic value of an image inputted through the image receiver 113 is not within the threshold value (threshold range), the reception controller 115 may determine there to be no fingerprint touch.

The reception controller 115 allows the image receiver 113 to store an image outputted from the fingerprint sensor 111 while the characteristic value of an image is not within the threshold value (threshold range), and then controls the image receiver 113 to provide the stored image to the fingerprint image processing unit 130.

The fingerprint image processing unit 130 receives fingerprint images of a plurality of frames (which are generated according to the time-series scan scheme) from the image receiver 113 of the fingerprint input unit 110, and generates a piece of rolled fingerprint through an image preprocessing operation.

To this end, the fingerprint image preprocessing unit 130 includes a preprocessor 131, a main data acquirer 133, and an image merger 135.

The preprocessor 131 generates a plurality of improved image frames with no noise, on the basis of a plurality of elemental image frames that are acquired through the fingerprint sensor 111. In an embodiment, the preprocessor 131 may remove noise between adjacent elemental image frames through an OR operation.

The main data acquirer 133 extracts main data on the basis of the improved image frames. In an embodiment, the main data acquirer 133 sums up data of the same pixel between adjacent improved image frames to extract main data by using an arithmetical addition operation.

The image merger 135 may merge images on the basis of main data image frames and acquire a final rolled fingerprint image. In an embodiment, the image merger 135 sequentially merges the main data image frames to acquire a rolled fingerprint image by using an AND operation.

Figure 2:
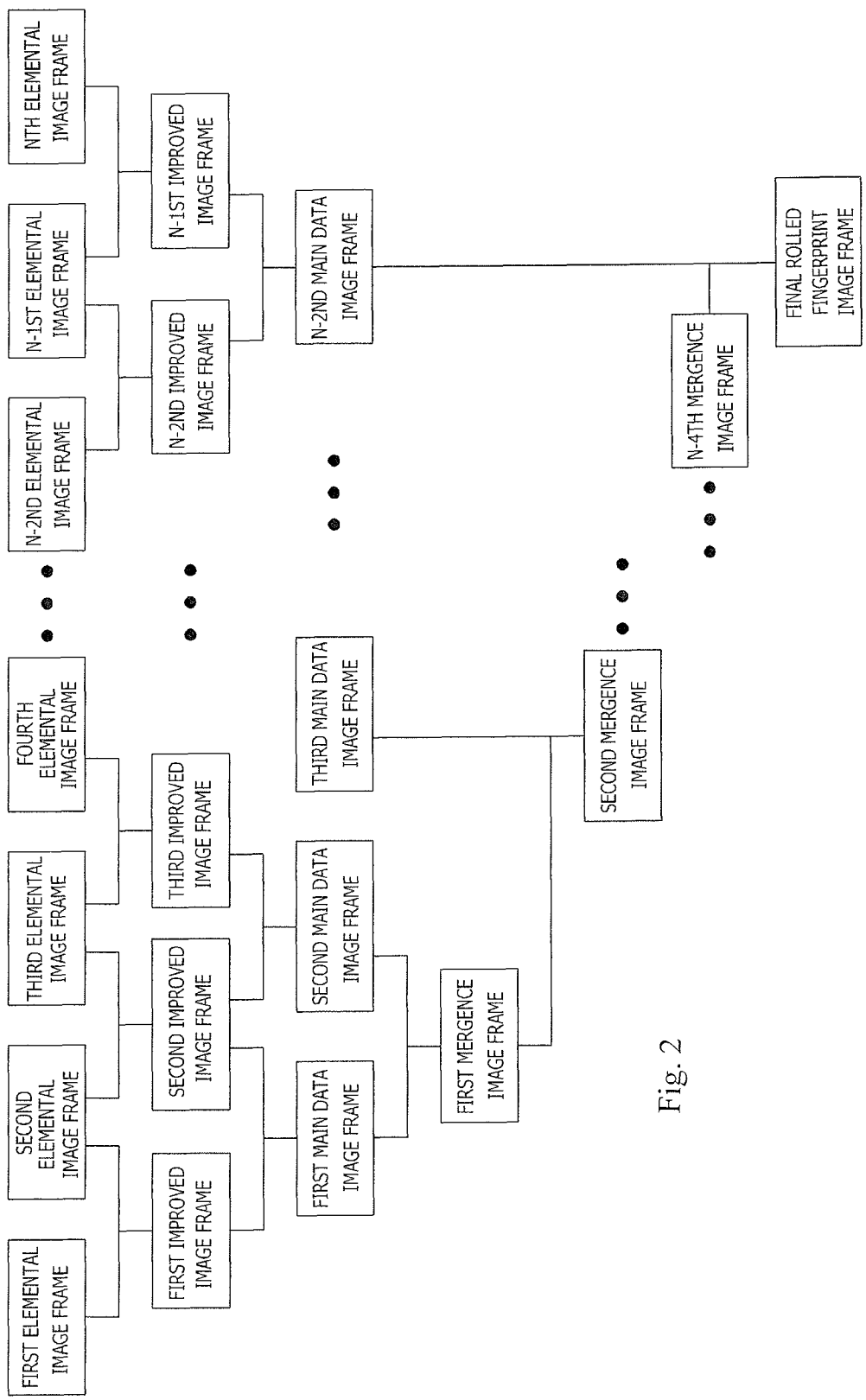
FIG. 2 is a flowchart illustrating an method for capturing rolled fingerprint image according to an exemplary embodiment of the present invention.
Figure 3:
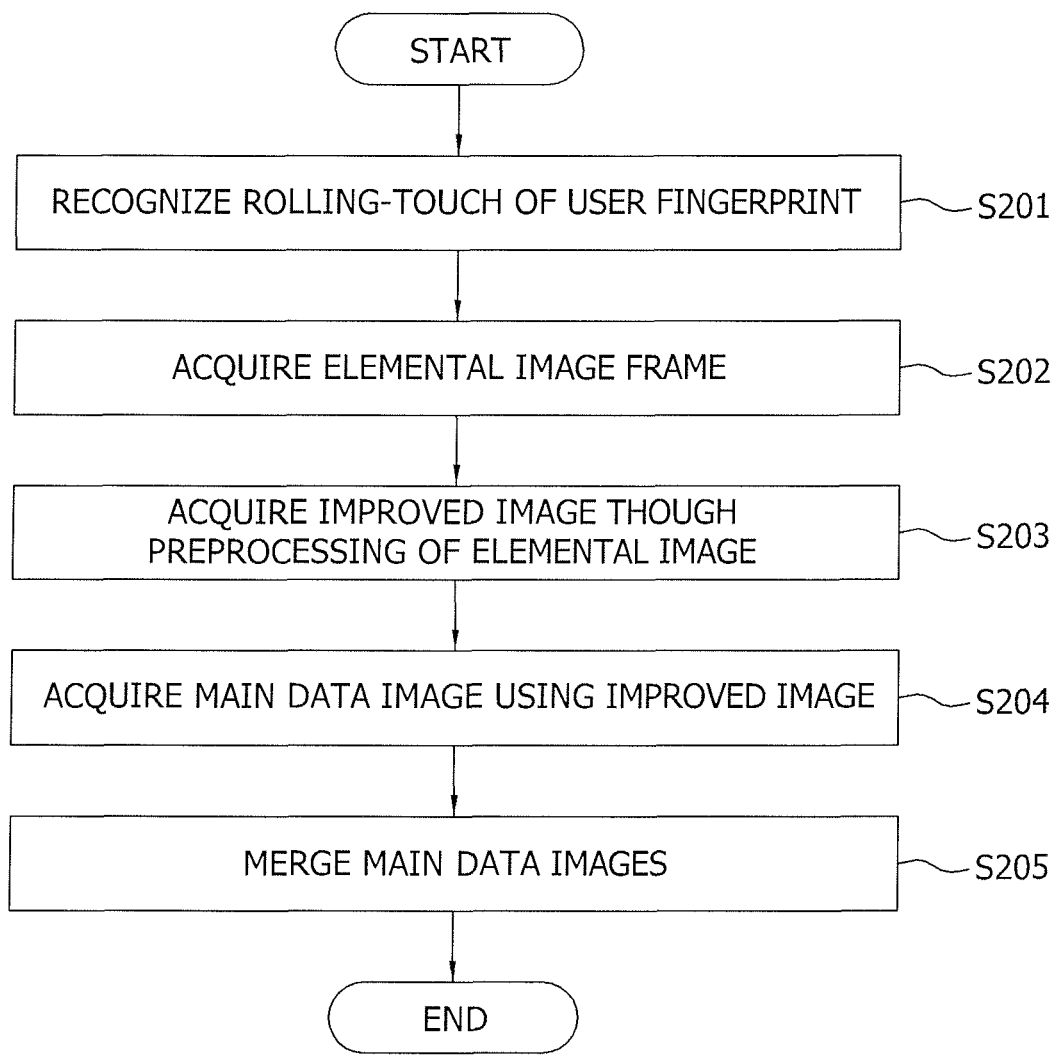
FIG. 3 is a frame structure diagram in an operation of capturing a rolled fingerprint image according to an exemplary embodiment of the present invention.

FIG. 2 is a flowchart illustrating a method for capturing rolled fingerprint image according to an exemplary embodiment of the present invention. FIG. 3 is a frame structure diagram in an operation of acquiring a rolled fingerprint image according to an exemplary embodiment of the present invention.

The method for capturing rolled fingerprint image according to an exemplary embodiment of the present invention will now be described with reference to FIGS. 2 and 3.

Acquire First to nth Elemental Image Frames: S201, S202

Figure 4:
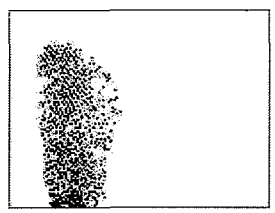
FIG. 4 is a diagram illustrating examples of elemental image frames that are acquired by a time-series scan scheme.
Figure 4:
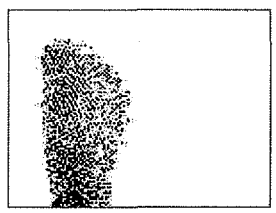
Figure 4:
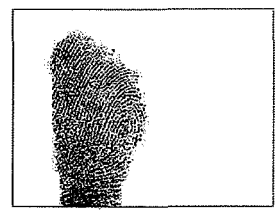
Figure 4:
Figure 4:
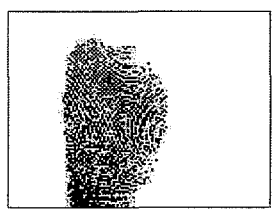
Figure 4:
Figure 4:
Figure 4:
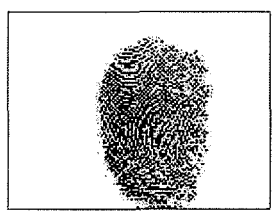
Figure 4:
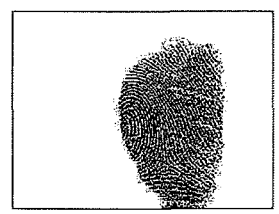
Figure 4:
Figure 4:
Figure 4:
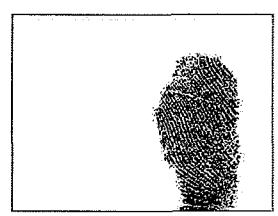

To acquire a rolled fingerprint image, the apparatus for capturing rolled fingerprint image 100 first acquires a plurality of elemental image frames. The elemental image frames correspond to a user fingerprint that rolling-touches the fingerprint input window 111a, and may be acquired using the time-series scan scheme. FIG. 4 is a diagram illustrating continuous image frames (first to twelfth elemental image frames) corresponding to "n=-12" as examples of the acquired elemental image frames.

Acquire First to n−1st Primary Conversion Image Frames: S203

The apparatus for capturing rolled fingerprint image 100 acquires the elemental image frames, and then acquires a plurality of improved image frames with no noise between adjacent elemental image frames.

To this end, the preprocessor 131 performs an OR operation on a plurality of data of the same pixel in adjacent elemental image frames. That is, the preprocessor 131 performs an OR operation between first and second elemental image frames to acquire a first improved image frame, and performs an OR operation between second and third elemental image frames to acquire a second improved image frame. In this way, the preprocessor 131 performs an OR operation on a plurality of data of ith and i+1st elemental image frames to acquire an ith improved image frame. Accordingly, when n number of first elemental image frames are generated, the preprocessor 131 acquires n−1 number of improved image frames.

Figure 5A:
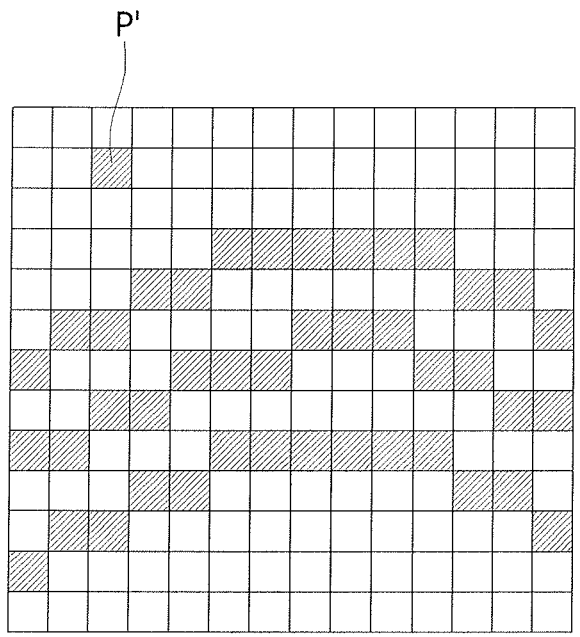
FIGS. 5A and 5B are schematic diagrams illustrating a pre-processing operation according to an exemplary embodiment of the present invention.
Figure 5B:
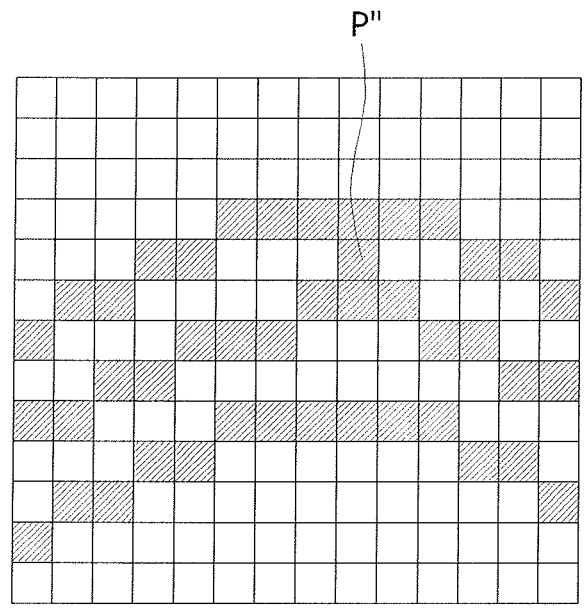

Table 1 is a truth table for an OR operation that is performed by the preprocessor 131, and FIGS. 5A and 5B are schematic diagrams illustrating a portion of the ith elemental image frame and a portion of the i+1st elemental image frame, respectively. An improved image acquiring operation performed by the preprocessor 131 will now be described with reference to Table 1 and FIGS. 5A and 5B.

TABLE 1

| (A) | (B) | A OR B |
|---|---|---|
| 0 | 0 | 0 |
| 0 | 1 | 1 |
| 1 | 0 | 1 |
| 1 | 1 | 1 |

FIG. 5A illustrates a plurality of pixels having the same coordinates as a portion of the ith elemental image frame. FIG. 5B illustrate a plurality of pixels having the same coordinates as a portion of the i+1st elemental image frame. Blocks of FIG. 5A indicate pixels of the ith elemental image frame, and blocks of FIG. 5B indicate pixels of the i+1st elemental image frame.

In FIGS. 5A and 5B, when each of the pixels consists of data having a 1-bit grayscale level, a black image has data of 0, and a white image has data of 1. Here, the black image is a fingerprint image that indicates one of a ridge and a hole, but may include a noise image such as a pixel P' or a blurred image, which is generated when a fingerprint is pressed, such as a pixel P'''.

The preprocessor 131 performs an OR operation on data of the same pixels of the ith and i+1st elemental image frames, and thus generates the ith improved image frame whose at least one pixel has data of 1. Accordingly, the preprocessor 131 allows the pixels P' and P''' of the ith improved image frame to have data of 1 by performing an OR operation.

In this way, the preprocessor 131 performs an OR operation between the ith and i+1st elemental image frames and thus improves a pixel having noise into a white image, thereby generating the clear ith improved image frame.

FIGS. 5A and 5B have been described above with a 1-bit level as an example, but an image having a 1-bit or more grayscale level may also be preprocessed by the above-described scheme.

For example, an image that is used in the apparatus for capturing rolled fingerprint image of the present invention may use image data having a 8-bit (0 to 255) grayscale level.

In an elemental image frame having 8-bit data for each pixel, when it is assumed that a pixel having noise has data of 13 and the same pixel having no noise has data of 218, binary data of each pixel are represent as "0000 1101" and "1101 1010". The preprocessor 131 performs an OR operation on two data and thus represents a pixel having noise in a grayscale level of 222 that is represented as "1101 1111", thereby generating an improved image frame with no noise.

Figure 6:
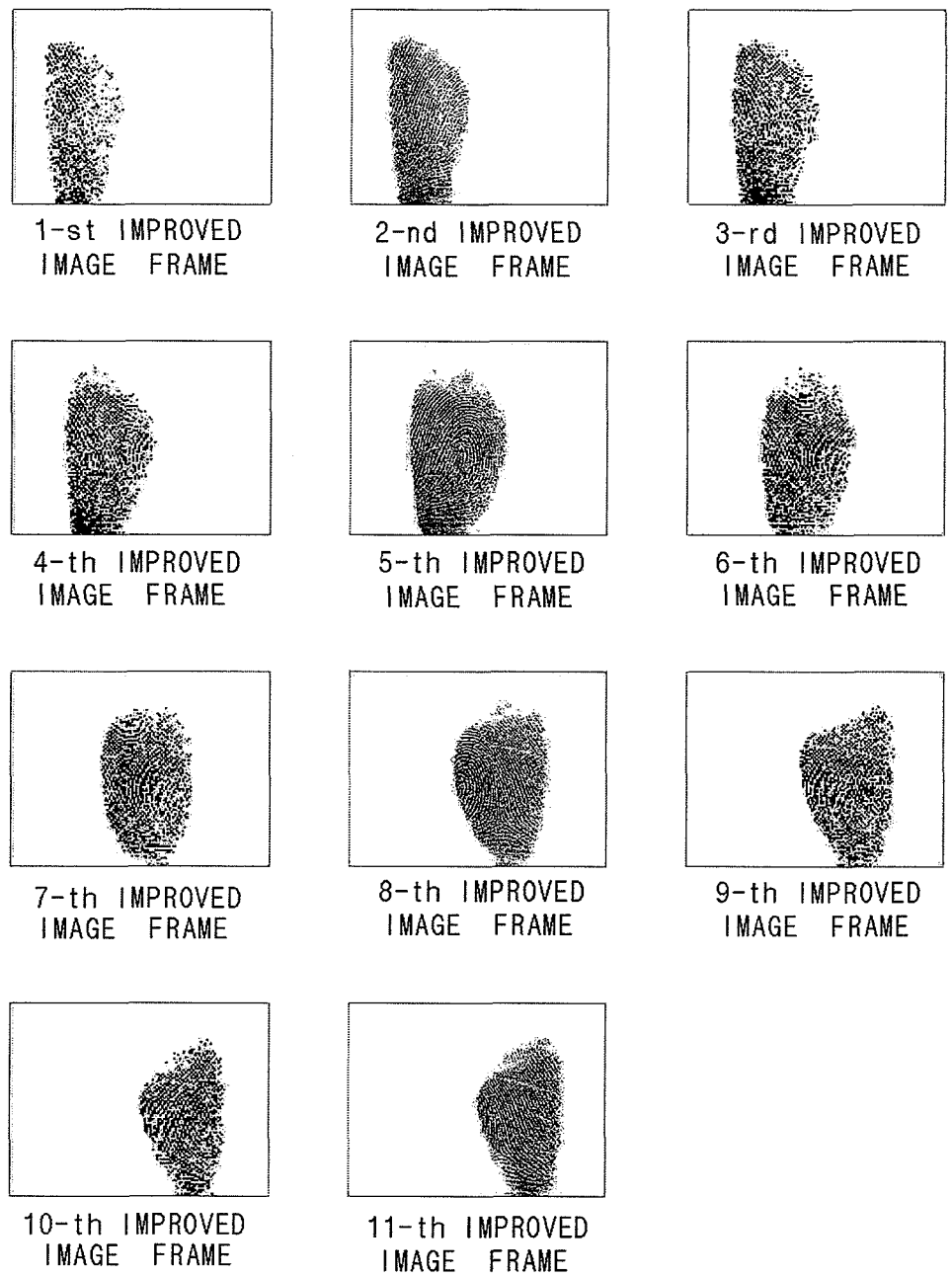
FIG. 6 is a diagram illustrating improved image frames that are acquired through the pre-processing operation.

As described above, the preprocessor 131 may acquire first to eleventh improved image frames of FIG. 6 on the basis of the elemental image frames of FIG. 4 having a 8-bit grayscale level.

Acquire Main Data Image Frame: S204

The apparatus for capturing rolled fingerprint image 100 acquires the improved image frames, and then acquires a plurality of main data image frames that emphasize an actual fingerprint image, on the basis of the improved image frames.

To this end, the main data acquirer 133 performs an arithmetic addition operation on data of the same pixels in the ith and i+1st elemental image frames to synthesize the image frames into a ith main data image frame.

The main data acquirer 133 may use a method that reduces overflow as expressed in Equation (1), for preventing the occurrence of a pixel that has data having a grayscale level higher than a limit grayscale level in the arithmetic addition operation.

$$\text{New Pixel} = \alpha \text{Pixel1} + (1-\alpha)\text{Pixel2} \tag{1}$$

The main data acquirer 133 uses Equation (1) in an operation that performs an arithmetic addition operation on the ith and i+1st elemental image frames, and thus can reduce overflow by applying a weight value for a specific improved image frame.

In this way, the main data acquirer 133 clearly differentiates black and white of adjacent improved image frames, and thus allows a black image and a white image to be clearly differentiated.

Figure 7:
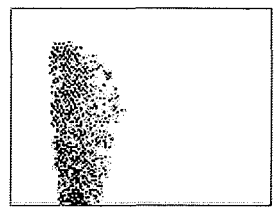
FIG. 7 is a diagram illustrating examples of main data image frames that are acquired by extracting main data.
Figure 7:
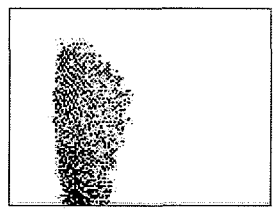
Figure 7:
Figure 7:
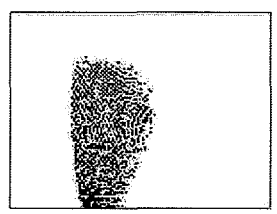
Figure 7:
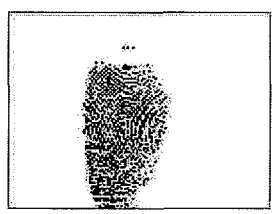
Figure 7:
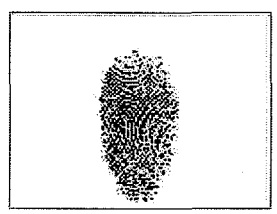
Figure 7:
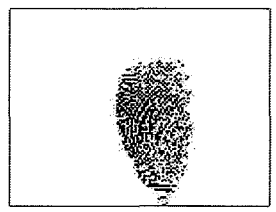
Figure 7:
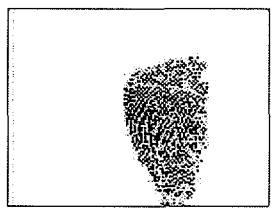
Figure 7:
Figure 7:
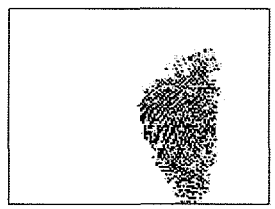

FIG. 7 is a diagram illustrating first to tenth main data image frames that have been acquired using the first to eleventh improved image frames of FIG. 6.

Acquire Image Mergence (Rolled Fingerprint Image) Frame: S205

The apparatus for capturing rolled fingerprint image acquires the main data image frames, and then merges images of the main data image frames to acquire a rolled fingerprint image.

To merge images, the image merger 135 sequentially performs an AND operation on the main data image frames. That is, the image merger 135 performs an AND operation on a first main data image frame and a second main data image frame to acquire a first mergence image frame. The image merger 135 performs an AND operation on the first mergence image frame and a third main data image frame to acquire a second mergence image frame.

That is, the image acquirer 135 acquires the first mergence image frame, and then acquires an i+1st mergence image frame by using an ith mergence image frame and an i+2nd main data image frame. Such an operation is repeated until the image merger 135 merges an n−4th mergence image frame and an n−2nd main data image frame to acquire a final rolled fingerprint image frame.

An operation in which the image merger 135 merges images through an AND operation will now be described.

Figure 8A:
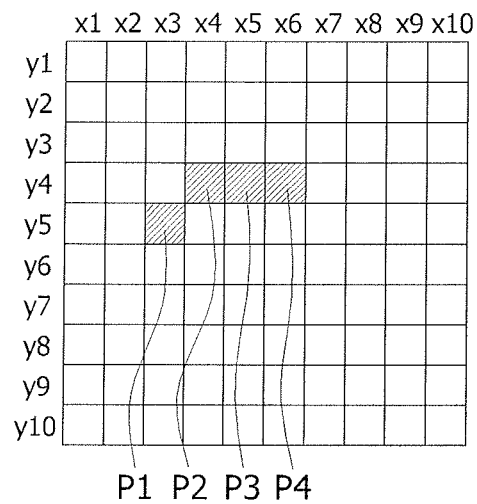
FIGS. 8A and 8B are schematic diagrams illustrating an image merging operation according to an exemplary embodiment of the present invention.
Figure 8B:
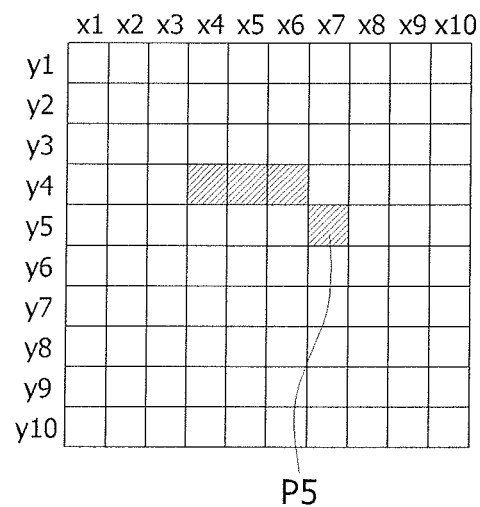
Figure 9:
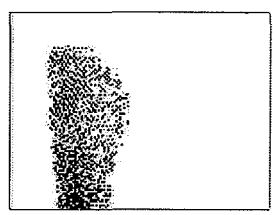
FIG. 9 is a diagram illustrating examples of image mergence frames that are acquired through the image merging operation.
Figure 9:
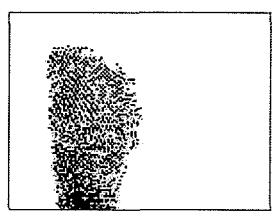
Figure 9:
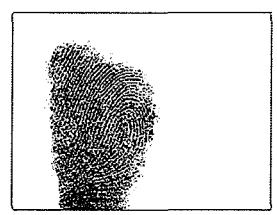
Figure 9:
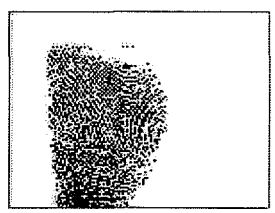
Figure 9:
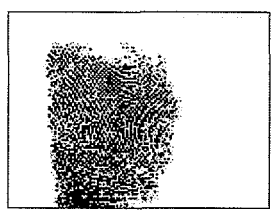
Figure 9:
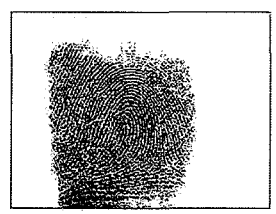
Figure 9:
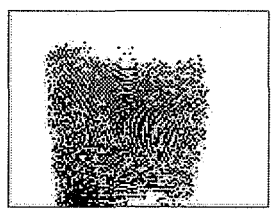
Figure 9:
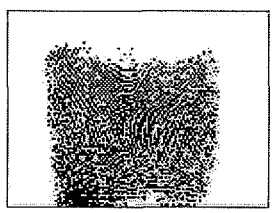
Figure 9:
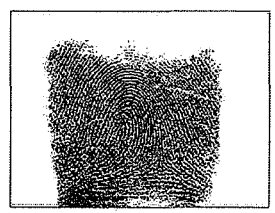

FIG. 8A is a schematic diagram illustrating an enlarged portion of the first main data image frame, and FIG. 8B is a schematic diagram illustrating an enlarged portion of the second main data image frame. In FIGS. 8A and 8B, each of a plurality of blocks indicates a pixel, and a black image of a pixel indicates a portion of a ridge or hole image of a fingerprint. And FIG. 9 is a diagram illustrating examples of image mergence frames that are acquired through the image merging operation In FIGS. 8A and 8B, when pixels respectively corresponding to coordinates (x3,y5), (x4,y4), (x5,y4), (x6,y4), and (x7, y5) are first to fifth pixels P1 to P5, the first to fourth pixels P1 to P4 have an black image in the first main data image frame, and the second to fifth pixels P2 to P5 have an black image in the second main data image frame.

In this case, as in the fifth pixel P5, a black image that is shown in only the second main data image frame corresponds to a fingerprint image that is newly inputted in an operation of rotating a fingerprint. This is because the first to tenth main data image frames are image frames that are obtained by sequentially converting the first to twelfth elemental image frames which are image frames that have been obtained in time series in the operation of rotating the fingerprint. That is, similarly to the elemental image frames, the reason is because the first to tenth main data image frames show characteristics of image frames that are obtained in time series by rotating a fingerprint.

The image merger 135 performs an AND operation that is expressed as Table 2, for merging fingerprint images of the main data image frames.

TABLE 2

| (A) | (B) | A AND B |
|---|---|---|
| 0 | 0 | 0 |
| 0 | 1 | 0 |
| 1 | 0 | 0 |
| 1 | 1 | 1 |

When the pixels of FIGS. 8A and 8B have a 1-bit level of data, the first to fifth pixels P1 to P5 that show black (black image) have data of 0, and a pixel that shows white (white image) have data of 1.

As shown in Table 2, the image merger 135 performs an AND operation on data, and thus outputs data of 0 as a result value with the exception of a pixel whose all data are 1. That is, the image merger 135 performs an AND operation on the first and second main data image frames, and thus generates the first mergence image frame whose all data of the first to fifth pixels P1 to P5 are 0. Accordingly, all the first to fifth pixels P1 to P5 of the first mergence image frame show a black image. As a result, the first mergence image frame represents an image that is obtained by merging images of the first and second main data image frames.

The above-described embodiment has been described with data of a pixel being 1 bit as an example. An image that is used in the apparatus for capturing rolled fingerprint image 100 may use an image that has a 1-bit or more grayscale level, for example, a 8-bit (0 to 255) grayscale level.

Even in an image having 8-bit data, the image merger 135 may merge images of main data image frames by performing an AND operation. In image data having a 8-bit grayscale level, a fingerprint image has data of 0 or data close to 0, and a pixel in which there is no fingerprint image has data close to 255. Even in performing an AND operation on two 8-bit data, 8-bit data close to 0 is outputted.

Therefore, when there is a pixel showing a black image in the main data image frames, the image merger 135 generates a mergence image frame having whose a pixel has a black image.

As described above, the method for capturing rolled fingerprint image of the present invention processes data by using a logical operation and an arithmetic operation, and thus can quickly acquire a rolled fingerprint. Also, the method for capturing rolled fingerprint image of the present invention removes noise in an operation of acquiring a rolled fingerprint, and clearly differentiates a fingerprint image and a background image, thus acquiring a clear rolled fingerprint image In the above description, the embodiments of the present invention have been illustrated and described above, but the present invention is not limited to the above-described specific embodiment. For example, the embodiments of the present invention have been described above based on a gray scale having 1-bit data or 8-bit data, but may be implemented based on a gray scale having another data value. Likewise, the method and apparatus for capturing rolled fingerprint image of the present invention may be applied to an image having three-color data for a color image instead of a gray scale.

According to the rolled fingerprint image capturing apparatus and method of the present invention, by processing data based on an arithmetical operation and logical operation for an image, a rolled fingerprint image can be acquired at a high speed.

Moreover, according to the rolled fingerprint image capturing apparatus and method of the present invention, the noise of an image is removed, and a fingerprint image and other images become clear.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An apparatus for capturing a rolled fingerprint image, comprising:

a fingerprint input unit for acquiring a plurality of sequential elemental image frames from a fingerprint as a finger that touches and rolls on a fingerprint input window, wherein each of the elemental image frames is composed of a plurality of pixels;

a preprocessor for of processing corresponding pixels in each sequential pair of elemental image frames to reduce noise, and for producing, for each sequential pair of elemental image frames a corresponding improved image frame, thereby generating a plurality of sequential improved image frame, each of the improved image frames being composed of a plurality of pixels;

a main data acquirer for processing corresponding pixels in each sequential [air of improved image frames, and for synthesizing, for each sequential pair improved image frames, a corresponding main data image frame with reduced data overflow and differentiating black and white portions of sequential improved image frames, thereby producing a plurality of sequential main data image frames, each of the main data frames being composed of a plurality of pixels; and an image merger for merging the sequential main data image frames to produce the rolled fingerprint image.

2. The apparatus for capturing a rolled fingerprint image of claim 1, wherein, in the processing of corresponding pixels in each sequential pair of elemental image frames to reduce noise, the preprocessor performs an OR operation on corresponding pairs of pixels in each sequential pair of elemental image frames so that a pixel having a black value and that is present in only one of the corresponding pair of pixels is changed to a white value.

3. The apparatus for capturing a rolled fingerprint image of claim 1, wherein, in the processing corresponding pixels in each sequential pair of improved image frames, the main data acquirer performs an arithmetic addition operation on corresponding pairs of pixels in each sequential pair of improved image frames to synthesize the sequential pairs of main data image frames.

4. The apparatus for capturing a rolled fingerprint image of claim 1, wherein in the merging of the sequential main data image frames, the image merger performs an AND operation on corresponding pixels in sequential pairs of the main data image frames so that a pixel having a black value and that is present in only one of the pair of corresponding pixels retains the black value, and, thereby, the main data frames are merged to produce a merged image as the rolled fingerprint image.

5. A method for producing a roiled fingerprint image, comprising:
   acquiring a plurality of sequential elemental image frames of a fingerprint as a finger that touches a fingerprint input window and rolls on the fingerprint input window, each of the elemental image frames being composed of a plurality of pixels;
   processing corresponding pixels in each sequential pair of elemental image frame to reduce noise, and producing, for each sequential pair of elemental image frames, a corresponding improved image frame, thereby generating a plurality of sequential improved image frames, each of the improved image frames being composed of a plurality of pixels;
   processing corresponding pixels in each sequential pair of improved image frames, and synthesizing, for each sequential pair of improved image frames, a corresponding main data image frame with reduced data overflow and differentiating black and white portions of sequential improved image frames, thereby producing a plurality of sequential main data image frames, each of the main data frames being composed of a plurality of pixels; and
   merging the sequential main data image frames to produce the rolled fingerprint image.

6. The method for producing a rolled fingerprint image of claim 5, wherein the processing corresponding pixels in each sequential pair of elemental image frames to reduce noise comprises performing an OR operation on corresponding pairs of pixels in each sequential pair of elemental image frames so that a pixel having a black value and that is present in only one of the corresponding pair of pixels is changed to a white value.

7. The method for producing a rolled fingerprint image of claim 5, wherein the processing corresponding pixels in each sequential pair of improved image frames comprises performing an arithmetic addition operation on corresponding pairs of pixels in each sequential pair of improved image frames to synthesize the sequential pairs of main data image frames.

8. The method for producing a rolled fingerprint image of claim 5, wherein the merging of the sequential main data image frames comprises performing an AND operation on corresponding pixels in sequential pairs of the main data image frames so that a pixel having a black value and that is present in only one of the pair of corresponding pixels retains the black value, and, thereby, the main data frames are merged to produce a merged image as the rolled fingerprint image.

* * * * *